DIAL OPERATED SEARCH CONTROL FOR TAPE RECORDER

Filed Oct. 30, 1967 5 Sheets-Sheet 1

INVENTORS
DAVID L. JOSLOW
JOHN J. BOSNAK
BY
McCormick, Paulding & Huber
ATTORNEYS

DIAL OPERATED SEARCH CONTROL FOR TAPE RECORDER

United States Patent Office 3,541,271

Patented Nov. 17, 1970

3,541,271

DIAL OPERATED SEARCH CONTROL FOR TAPE RECORDER

David L. Joslow, Chester, and John J. Bosnak, Old Saybrook, Conn., assignors to Chester Electronic Laboratories, Inc., Chester, Conn., a corporation of Connecticut Filed Oct. 30, 1967, Ser. No. 678,799
Int. Cl. G11b *15/20, 15/44, 19/26*
U.S. Cl. 179—100.2 15 Claims

ABSTRACT OF THE DISCLOSURE

A dial operated control mechanism is disclosed for providing access to information recorded in serial fashion on magnetic tape or the like. The tape or other record medium is divided into a number of segments or programs and on a separate track cue signals mark the beginning of each program. Each program has a number assigned to it corresponding to its position on the tape. By dialing a number on the associated dial the control mechanism is caused to make the tape transport or other drive for the record medium first search for and then play the program having the dialed number, the search process involving a counting of cue signals as the record medium is moved in either a fast forward or fast reverse condition. At the end of the search process, and before the playing of the selected program begins, the record medium is recued to bring the last detected cue signal back to the detecting device to take up the travel of the record medium occurring during its stopping and to thereby assure that the selected program is played from its very beginning. A switch is provided whereby the mechanism may be set so that at the end of the playing of a program the record medium drive is either automatically stopped or automatically caused to replay the same program.

BACKGROUND OF INVENTION

This invention relates to recorders such as magnetic tape recorders wherein information is stored on a record medium in a serial fashion and deals more particularly with a dial operated mechanism for use with such a recorder for enabling it to automatically search for and play back a prerecorded segment of information on the record medium.

The control mechanism of this invention may be, at least in its broader aspects, used with various recorders and record media, wherein information is stored on the record medium in the form of prerecorded segments or programs of substantial length serially following one another on the record medium. The record medium may for example, be a magnetic tape or wire, a magnetic drum or belt, or a punched paper tape. At the present, however, the primary application of the control mechanism of this invention is for use with tape transports used for recording and playing back audio and/or video programs through a magnetic tape. For convenience, in the description which follows the control mehcanism has been described in conjunction with a magnetic tape recorder but it should be understood that the invention is not necessarily limited to such a specific use.

An exemplary application of the invention is in the educational field where it may be used to control the operation of a video tape recorder supplying a student at a student study area with a video instructional program appearing on a television monitor. The tape on the video tape recorder is prerecorded with a large number of different programs, of perhaps several minutes length each, and by dialing the dial of the control mechanism the tape recorder is automatically caused to rapidly locate and then play back to the student a selected one of the programs on the tape. The dial may be located at the student work area so as to be operable by the student or may be placed at a remote location, such as a control console, for operation by an instructor.

The general object of this invention is, therefore, to provide a control mechanism of the foregoing character which is, among other things, simple to operate, of a rugged design utilizing primarily solid state components, and readily adapted to use with various different tape transports.

SUMMARY OF INVENTION

A dial operated control mechanism for providing random access to information recorded in serial fashion on a tape or the like includes a register or counter for receiving dial pulses, a register or counter for receiving pulses derived from cue signals on the record medium marking the start of individual programs, and a comparator or parity detector for comparing the number stored in the dial pulse counter with the number stored in the cue signal counter. An associated logic circuit controls the operational mode of a tape transport or other record medium drive. In response to a non-parity signal from the parity detector the logic commands the drive to operate in either a fast forward or fast reverse (rewind) mode depending on the nature of the non-parity signal, and when parity is reached the drive is stopped, then moved in the reverse direction to return the record medium to the last detected cue signal, and then placed in a play mode so as to play back the program following such cue signal. The cue signal counter is set to count in either a reverse or forward direction depending on the direction in which the record medium is moved during the search operation. When the record medium is moved in the fast reverse direction a pulse subtractor prevents the first cue signal from reaching the cue signal counter, to cause it to count properly.

DETAILED DESCRIPTION OF THE PREFERRED EMBODIMENT

Figure 1:
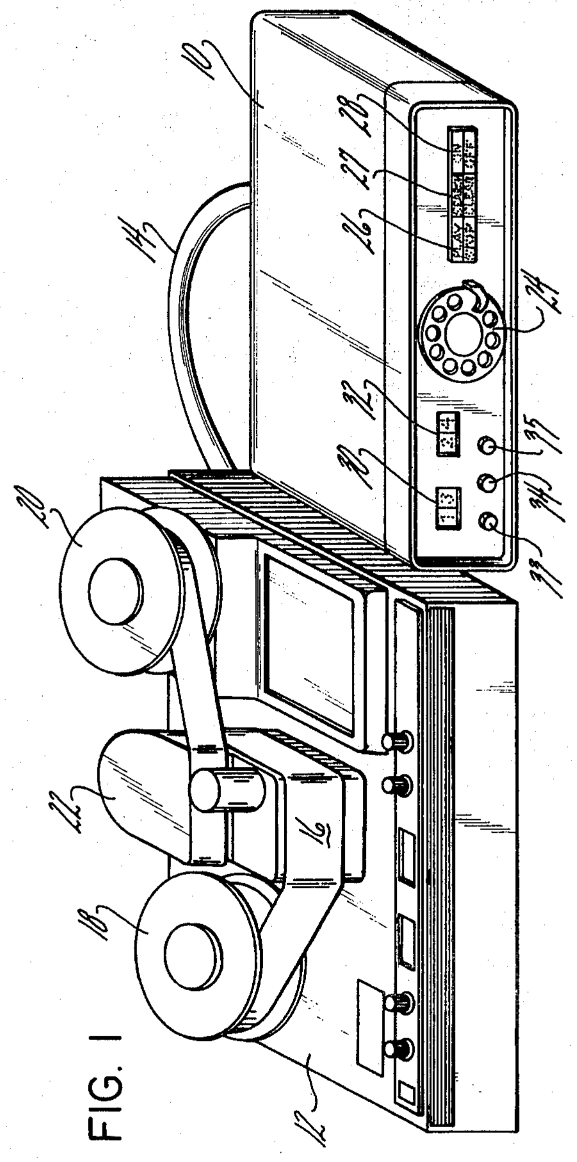
FIG. 1 is a perspective view showing a dial operated control mechanism embodying this invention connected with an associated tape recorder.
Figure 2:
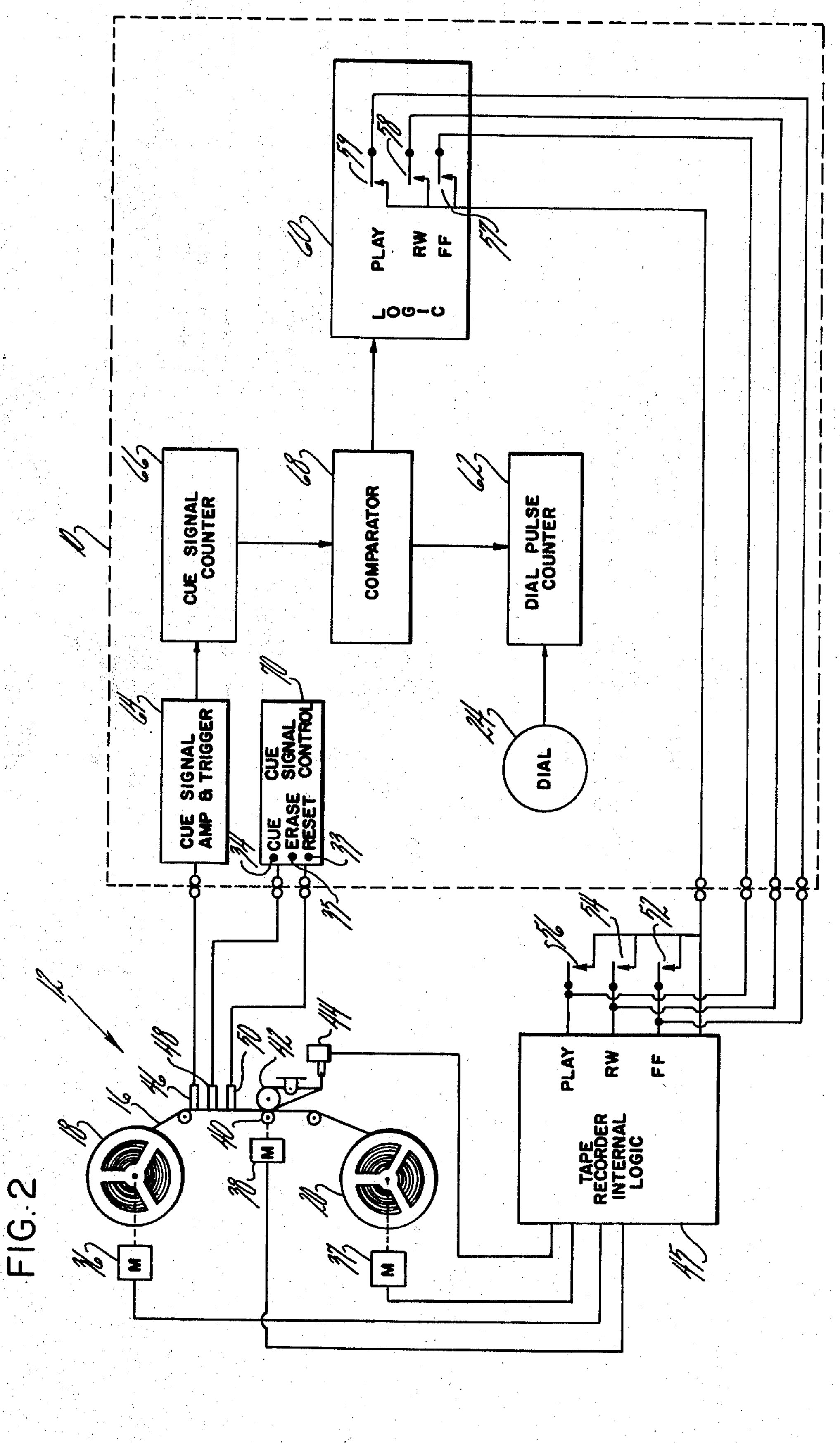
FIG. 2 is a block diagram showing the basic components of the control mechanism of FIG. 1 and their inter-relationship with one another and with the associated tape recorder.

General organization—FIGS. 1 and 2

FIGS. 1 and 2 show the general organization and environment of a control mechanism embodying this invention. Referring first to FIG. 1, this figure shows a control unit 10, embodying this invention, in association with a video tape recorder 12. The inter-connection between the two units is made by means of a cable 14 containing a number of conductors which are connected to and between electrical terminals on the rear panels of the units. For simplicity, in FIG. 1 the control unit 10 and the tape recorder 12 have been shown side by side, but this arrangement is not necessary and, if desired, the control unit may be placed quite some distance from the tape recorder 12. For example, in the case where the tape recorder 12 is part of an audio-video learning laboratory and used to supply programs to one or more video monitors at one or more student work areas, the tape recorder 12 may be located in an equipment rack, cabinet or closet and the control unit 10 may be located at an instructor's console or at one of the student work areas.

The tape recorder 12, as is conventional, uses a magnetic tape 16 wound on two spools 18 and 20, as the record medium. In passing from one spool to another the tape moves around a housing 22 which includes a number of pick-up heads for retrieving information recorded on the tape. In the case of a video recorder, such as that shown at 12, one head is provided for picking up a video signal from one channel of the tape 16 and another head is provided for picking up an associated audio signal from another channel of the tape. When the tape recorder 12 is used with the control unit 10 a third pick-up head is provided in the tape recorder for picking up audio frequency cue signals recorded on a third channel of the tape. Other heads may also be provided for recording and erasing such cue signals on and from the third channel of the tape.

The control unit 10 is particularly adapted for use with a tape recorder, such as that shown at 12, in the case where the tape 16 has recorded thereon a large number of different programs located along different lengths of the tape and serially following one another. For example, the tape may contain thirty different programs each having a playing time of about two minutes and the purpose of the control unit 10 is to automatically control the operation of the tape recorder 12 so as to cause it to rapidly search for and then play any selected one of the thirty programs on the tape. Manual control of the unit 10 is effected by a telephone type dial switch 24 and three two position switches 26, 27 and 28 all located on the front panel of the unit. The various programs on the tape are assigned numbers in accordance with the order in which they appear on the tape and the number of a desired program is fed into the unit 10 by operation of the dial switch 24. A first digital readout 30 on the front panel of the unit indicates the number of the program presently at the pick-up heads of the tape recorder and a second digital readout 32 indicates the number of the program selected by operation of the dial switch.

The switch 26 is a two-position play-stop switch, the switch 27 is a two-position search-clear switch and the switch 28 is a two position on-off switch. The on-off switch 28 is the main power switch for the control unit 10 and when in its *on* position it conditions the unit 10 for operation in controlling the tape recorder 12. When the switch 28 is in its *off* position the unit 10 is in an off condition and has no effect on the tape recorder. The search-clear switch 28 and the play-stop switch 26, provide inputs to the control unit 10 conditioning it to perform in different manners. Basically, the search-clear switch when in its *search* position conditions the unit 10 to cause the tape recorder 12 to automatically search for the program whose number is dialed into the unit by the dial switch 24. When the search-clear switch is in its *clear* position the unit is put into a condition to receive a new number from the dial switch. The stop-play switch 26 basically conditions the unit 10 to cause the tape recorder 12 to either play or not play the searched for program after such program is located. When the switch 26 is in the *play* position the searched for program is played immediately after it is located. When the switch 26 is in its *stop* position the tape recorder 12 is stopped after the searched for program is located. If the search-clear switch 27 is placed in the *search* position, and the play-stop switch 26 is placed in the *play* condition, the tape recorder after locating the searched for program will play such program and will then repeatedly replay such program until either the switch 26 is placed in its *stop* position or the switch 27 placed in the *clear* position. If the switch 26 is moved to its *stop* position the playing of the program will stop immediately upon such switch movement. If the switch 27 is placed in the *clear* position, while the switch 26 is maintained in its *play* position, the program being played will play to its end and then the tape recorder 12 will stop.

In the normal operation of the control unit 10 of FIG. 1, the switch 28 is placed in the *on* position, the switch 26 is placed in the *play* position and the switch 27 is placed in the *clear* position. The number of the desired program is then dialed into the unit 10 by operation of the dial switch 24. After this is done, the switch 27 is placed in the *search* position and the tape recorder 12 is thereby caused to search for and then play the program corresponding to the number dialed into the unit 10 by the switch 24. If it is desired to have the program stopped at its end without being replayed, the switch 27 is returned to its *clear* position. If it is desired to have the program replayed after it reaches its end the switch 27 is left in the *search* position. If it is desired to select a new program, the switch 27 is placed in the *clear* position and the number of the new program is dialed into the unit by operating the dial switch 24. Thereafter, as soon as the switch 27 is returned to the *search* position, the tape recorder 12 will be caused to search for and play the newly selected program. If the switch 27 is returned to the *search* position while the tape recorder 12 is still playing the previous program, such previous program is immediately interrupted and the tape moved to the new program. If the switch 27 is left in the *clear* position, the tape recorder 12 will continue to play the previous program and will stop at the end of such program. The tape recorder then remains in this stopped condition until the switch 27 is placed in the *search* position and then at that time the new program is searched for and played.

Still with reference to FIG. 1, the control unit 10 there illustrated also includes three push buttons 33, 34 and 35 which are used for applying cue signals to the tape 16. That is, these push buttons are used when a new tape, not having any prerecorded cue signals, is placed on the tape recorder 12 or when it is desired to make changes in the location of cue signals on a tape already including such signals. The push button 32 is a reset push button and when operated resets various counters or registers and other components of the unit 10 to a given initial condition at the start of placing cue signals on a new tape. The push button 34 controls the production of a cue signal and when depressed and released causes the recording of a cue signal of predetermined duration on the cue channel of the tape 16. The push button 35 when depressed energizes an erasing head in the tape recorder 12 to erase any cue signal on the cue channel of the tape 16 passing by an associated erase head at the time the button 35 is depressed. The cue signal recording and erasing functions provided by the push buttons 33, 34 and 35 are, of course, not necessary in the case where the tape 16 has proper cue signals prerecorded thereon prior to being placed on the tape recorder 12, and once proper cue signals are placed on the tape 16, the buttons 33, 34 and 35 need not be manipulated. Therefore, these buttons are preferably placed in a recess of the control unit housing and normally covered by an access door so as to be normally hidden and less likely to be inadverently operated.

FIG. 2 shows in more detail the basic components of the control unit 10 and the associated tape recorder 12. In this figure, the parts of the control unit 10 are enclosed within the broken line box and the parts of the tape recorder 12 are located to the left of this box. Considering first the tape recorder 12, this unit includes a first motor 36 for driving the tape spool 18, a second motor 37 for driving the tape spool 20 and a third motor 36 for driving a capstan 40. A pressure wheel 42 is located on the opposite side of the capstan 40 from the tape 16 and is moved into and out of feeding relationship with the tape and capstan by a solenoid 44. Associated with the motors 36, 37 and 38 and the solenoid 44 is an internal logic circuit 45 which controls the energization of these motors and solenoids so as to cause the tape 16 to be moved in either a fast forward, a rewind (fast reverse), or play rate of speed. For operation in the fast forward mode the motor 36 is energized to drive the spool 18 in the winding direction, the motor 37 is energized so as to exert a slight braking action on the spool 20 and the solenoid 44 is conditioned to hold the pressure wheel 42 away from the tape 16. In the rewind mode of operation, the motor 37 is energized to rapidly rotate the spool 20 in the winding direction, the motor 36 is energized to exert a slight braking action on the spool 18 and the solenoid 44 is again conditioned to hold the pressure wheel 42 away from the tape. In the play mode of operation, the motor 36 is energized so as to drive the spool 18 in the winding direction, to energize the motor 37 to exert a slight braking action on the spool 20 and to condition the solenoid 44 to move the pressure wheel 42 into engagement with the tape 16 and to press the tape against the capstan 40 so that the tape is moved past the associated cue channel heads 46, 48 and 50, and other heads (not shown) for the main video and audio channels, at a speed determined by the speed of the capstan.

The internal logic 45 of the tape recorder includes one set of contacts 52 which when closed causes the logic to energize the motors and solenoid for operation of the recorder in the fast forward mode, another set of contacts 54 which when closed causes the logic to energize the motors and solenoid for operation of the recorder in the rewind mode and another set of contacts 56 which when closed causes the internal logic to condition the motors and solenoid to operate the recorder in the play mode. The control unit 10 is electrically connected to the internal tape recorder logic 45 and includes three sets of contacts 57, 58 and 59 which are respectively connected in parallel with the three aforementioned contact sets of the internal logic. That is, when the contacts 57 of the control unit 10 are closed they shunt the fast forward contacts 52 of the internal tape recorder logic and, therefore, place the tape recorder in its fast forward mode of operation. Likewise, the closing of the contacts 58 in the unit 10 shunts the contacts 54 of the tape recorder internal logic and places the tape recorder in its rewind mode of operation, and closing of the contacts 59 shunts the contacts 56 of the internal tape recorder logic and places the tape recorder in its play mode of operation.

The contacts 57, 58 and 59 are part of a logic circuit 60 of the control unit 10. In addition to this logic circuit, the control unit 10 also includes the dial switch 24, a dial pulse counter 62, a cue signal amplifier and trigger 64, a cue signal counter 66 and a comparator or parity detector 68, and a cue signal control circuit 70. The dial pulse counter 62 is a binary counter and counts pulses received thereby from the dial 24. The cue signal counter 26 is also a binary counter and counts signals supplied thereto by the cue signal amplifier and trigger 64. The cue signal amplifier and trigger 64 is in turn connected with the pick-up head 46 in the tape recorder which picks up cue signals from the cue signal channel of the tape 16. The cue signals recorded on the tape 16 are in the nature of tones which extend along a predetermined length of the tape. For example, each cue signal may be a 120 cps. recorded tone extending along several inches of the tape so that as it passes the pick-up head 46 it induces in the head an alternating signal or tone which persists for approximately half a second or more depending on the speed of the tape. In response to receipt of a tone from the pick-up head 46, the cue signal amplifier and trigger 64 produces a pulse which persists for as long as the tone. Therefore, each time a recorded cue signal passes the pick-up head 46, one pulse is produced from the amplifier and trigger 64 and these pulses are counted by the cue signal counter 66. The amplifier portion of the amplifier and trigger 64 may be a simple audio amplifier and the trigger a Schmitt trigger which is triggered in response to an output from the amplifier.

The comparator 66 of the control unit 10 compares the counts of the cue signal counter 66 and the dial pulse counter 62 and produces output signals, representative of the nature of the comparison, which are transmitted to the logic circuit 60. In response to the signals received from the comparator the logic circuit 60 operates the switches 57, 58 and 59 in the manner required to cause proper movement of the tape 16 by the recorder 12.

In general, the operation of the comparators 68 and logic circuit 60 is such that when the dial pulse counter 62 contains a number higher than the cue signal counter 66 a signal is transmitted to the logic unit 60 which causes the contacts 57 to be closed placing the tape recorder 12 in the fast forward mode of operation. As the tape 16 is moved in this fast forward manner, cue signals which pass the pick-up head 46 are counted by the cue signal counter 66 until the number contained in this counter is the same as the number in the dial pulse counter. Thereupon, the comparator 68 produces a signal which causes the logic circuit to open the switch 57. When the fast forward contacts 57 are opened, however, the movement of the tape 16 is not immediately stopped and generally by the time the tape has come to a complete halt the cue signal which shifted the comparator into parity will have moved some distance beyond the pick-up head 46. The logic unit 60, therefore, after the opening of the fast forward contacts 57, closes the rewind contacts 58 to cause the tape recorder to move the tape 16 in the reverse direction until the cue signal is brought back to the pick-up head 46. This is referred to hereinafter as "recuing." Thereupon, after the recuing operation is completed, the rewind contacts 58 are opened and the play contacts 59 closed to place the tape recorded in the play mode of operation to play the program following the parity causing cue signal. In the event the dial pulse counter 62 has a lower count than the cue signal counter 66 at the beginning of the search operation, substantially the same sequence of operations takes place except that initially the rewind contacts 58 are closed to move the tape in the reverse direction and as such movement takes place the cue signal counter 66 is counted down, or in the reverse direction, until its count equals the count of the dial pulse counter. Also, in recuing, the tape is moved in the forward direction rather than in the reverse direction by closing the contacts 55.

The cue signal control 70 of the control unit 10 includes the reset push button 33, the cue push button 34 and the erase push button 35, and is connected to a record head 48 and an erase head 50 located adjacent the path of the tape 16. When the cue push button 34 is depressed it sends a tone signal of predetermined duration to the record head 48 which records the tone on the cue channel of the tape 16 to mark the beginning of a program. The cue signal push button 34 is also preferably connected with the erase head 50 so that at the same time as a tone is supplied to the recording head 48 an erase signal is supplied to the erase head 50. The erase push button 35 also controls the erase head 50 and when depressed energizes the erase head to erase any cue signal which may be on the portion of the tape passing the erase head at that time. The reset push button 33 of the cue signal control when depressed resets the cue signal counter 66 and the dial pulse counter 62 to zero counts and resets the logic circuit 60 to a given initial condition.

Detailed organization and operation of the control mechanism—FIGS. 3A, 3B and 3C and 4

Figure 3A:
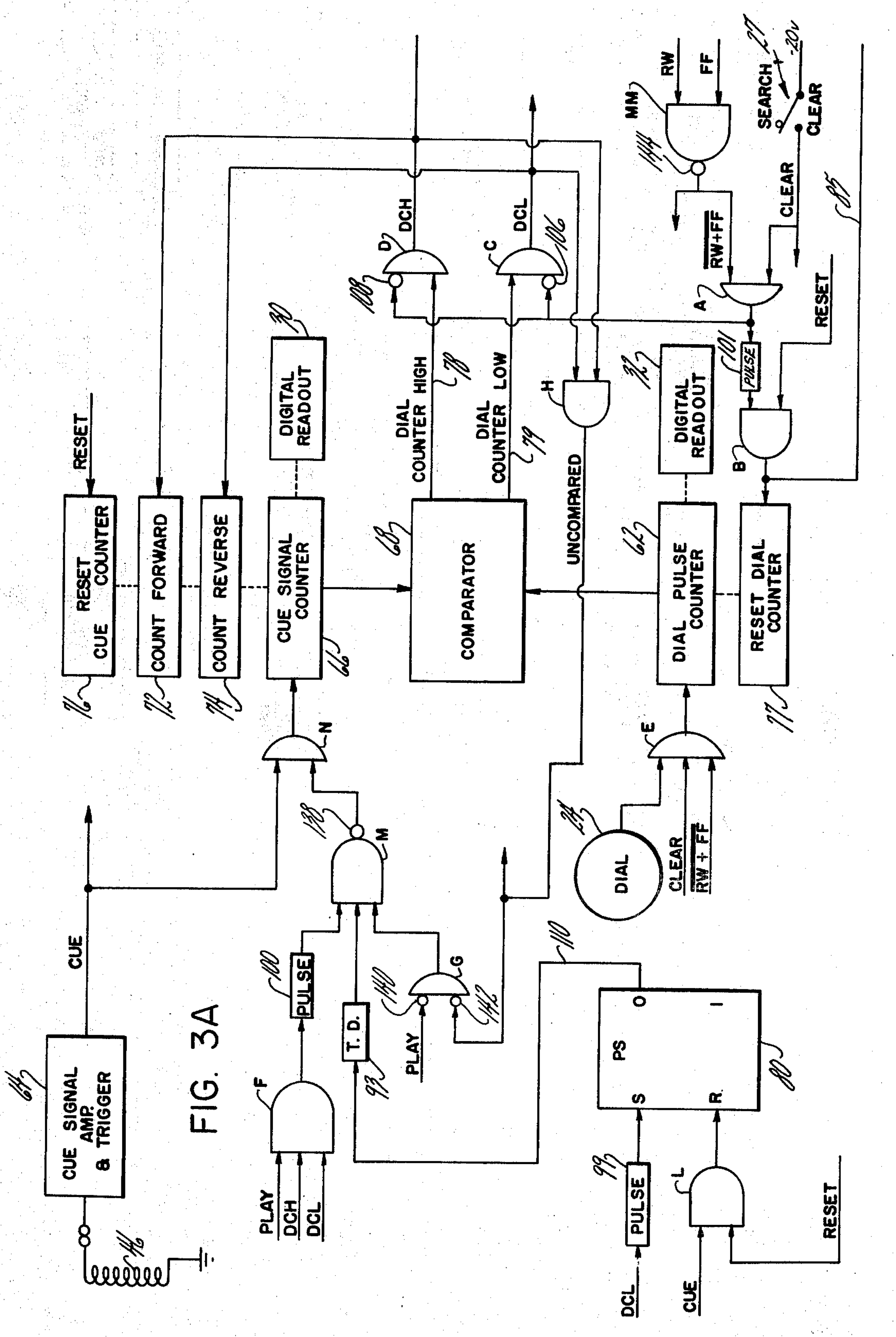
FIG. 3A, FIG. 3B, and FIG. 3C, when placed end-to-end with FIG. 3A at the left, FIG. 3B in the middle and FIG. 3C to the right, constitute a single figure comprising a block diagram showing in more detail the components making up the control mechanism of FIG. 1.
Figure 3B:
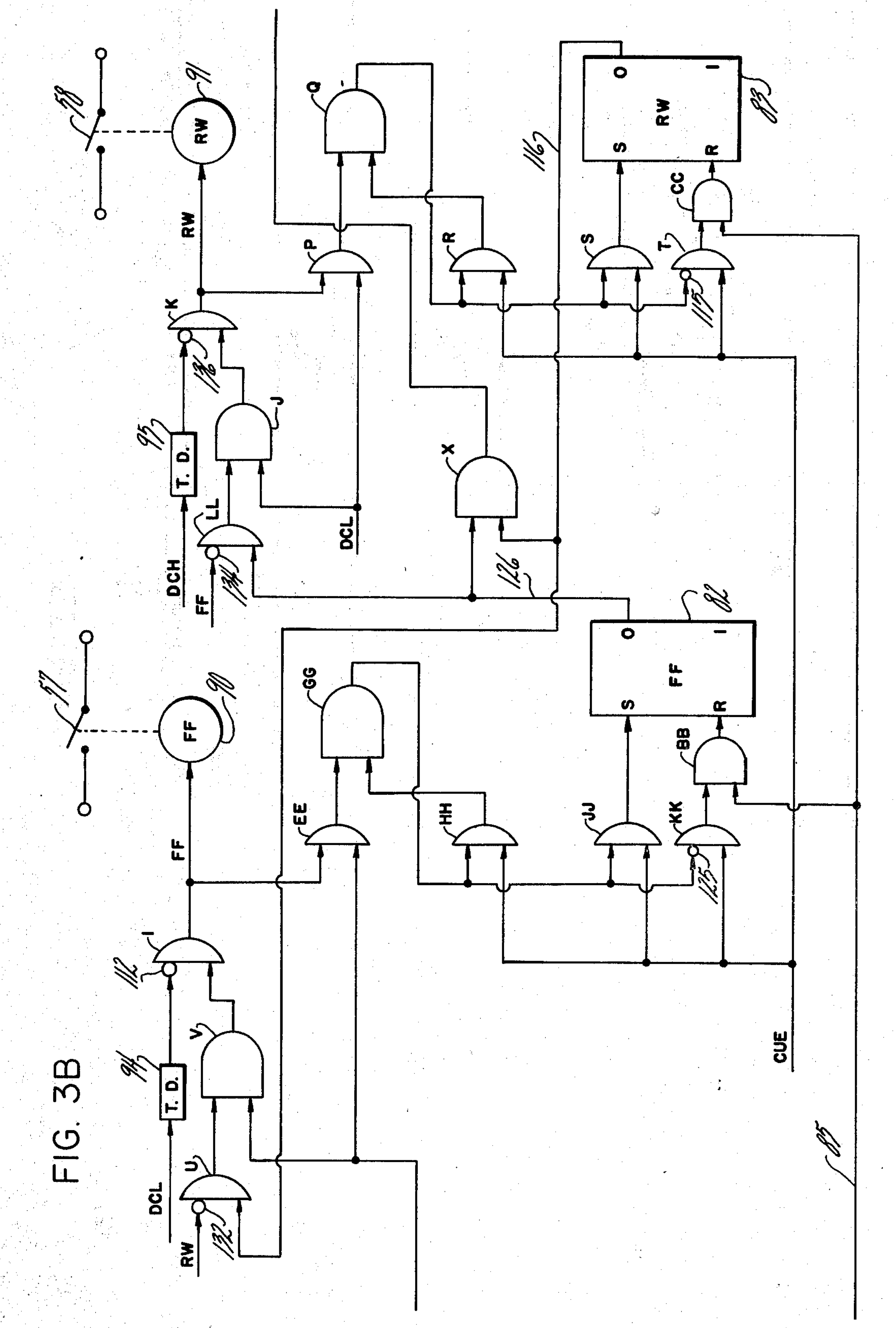
Figure 3C:
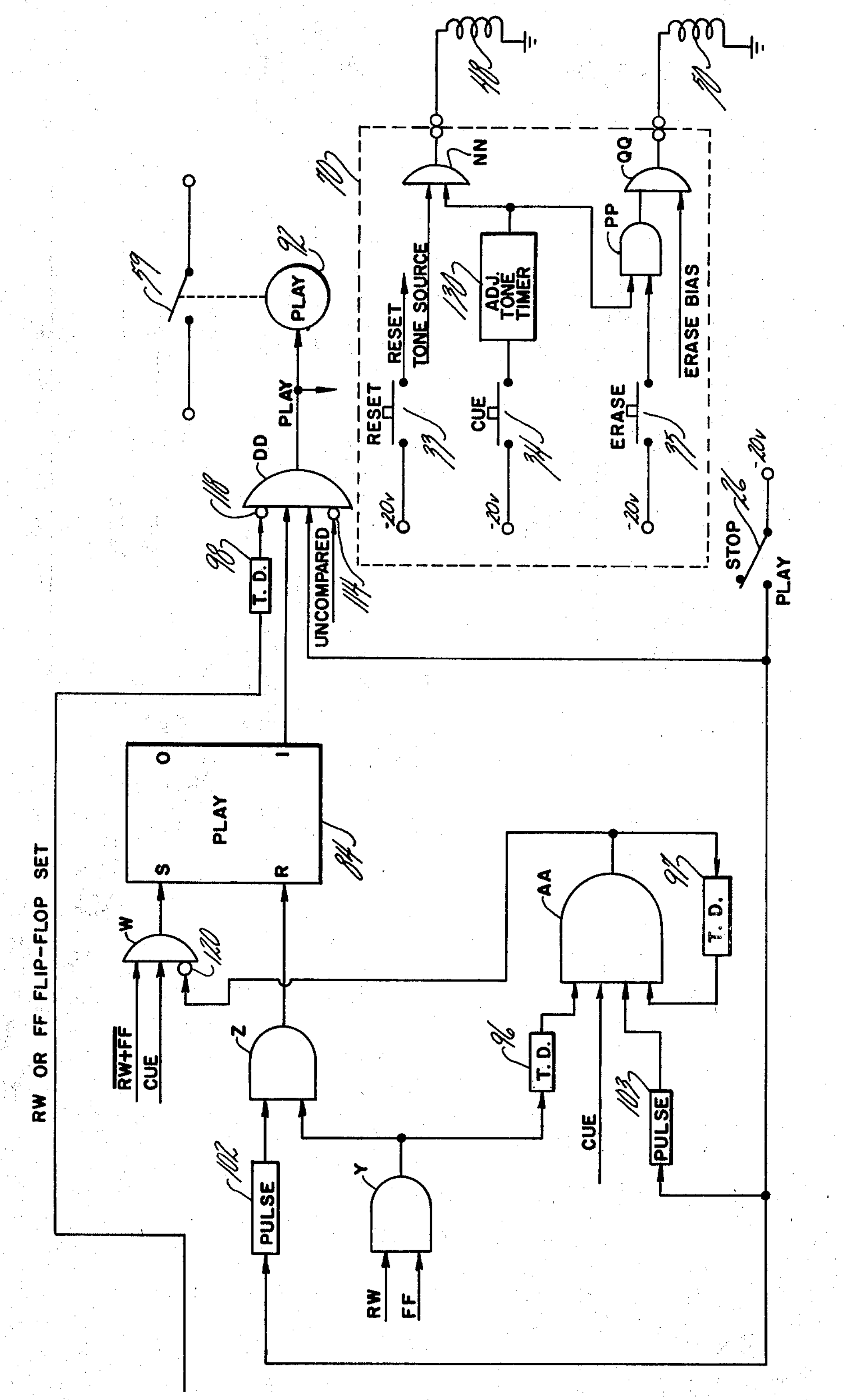

FIGS. 3A, 3B and 3C when placed end to end constitute one figure showing the various components of the control unit 10 of FIGS. 1 and 2 in more detail. This figure is in the nature of a block diagram showing the unit as consisting, among other things, of AND gates, OR gates, inverters and flip-flops. Basically, the unit is a binary digital system with its various components being operated by input signals having either a first level, referred to as the zero level, or another level, referred to as the one level. For example, ground potential may be taken as a zero level signal and a potential of minus twenty volts, or any other potential substantially below ground, may be taken as a one level signal.

Considering first the counters and the comparator or parity detector, it should be noted from FIG. 3A that the cue signal counter 66 includes a circuit 72 which when energized by a one level input signal conditions it to count in the forward direction, and also includes a second circuit 74 which when energized by a one level input signal conditions it to count in the reverse direction. Another circuit 76 is also included in the cue signal counter 66 and operates when energized by a one level input signal to reset the counter to a zero count. The cue signal counter is a binary counter and suitable circuits for it as well as for the forward counting circuit 72, the reverse counting circuit 74 and reset circuit 76, are well known in the art and need not be described in detail. The digital readout 30 is connected with the cue signal counter 66 and includes a binary to decimal converter for converting the binary number in the counter to a decimal number presented by the readout.

The dial pulse counter 62 is, or may be, a generally conventional binary counter and includes a reset circuit 77 which when energized by a one level signal resets it to a zero count. The digital readout 32 is connected with the counter 62 and includes a binary to decimal converter for converting the binary number in the counter to a decimal number presented by the readout.

The comparator or parity detector 68 also is, or may be, of generally conventional construction and need not be described in detail. It includes two output lines 78 and 79 on which appear signals representative of the nature of the comparison made thereby. If the count of the dial pulse counter 62 is higher than the count of the cue signal counter 66 a one level signal appears on the output line 78 and a zero level signal appears on the line 79. If the count of the dial pulse counter 62 is lower than the count of the cue signal counter 66 a one level signal appears on the line 79 and a zero level signal appears on the line 78. When the counts of the two counters are equal, zero level signals appear on both of the lines 78 and 79.

Except for the cue signal amplifier and trigger 64, the dial 24, and the cue signal control 70, the remainder of the components shown in FIGS. 3A, 3B and 3C are part of the logic circuit 60 of FIG. 2. This circuit includes four bistable flip-flops respectively referred to as a pulse subtracter flip-flop 80, a fast forward flip-flop 82, a rewind flip-flop 83 and a play flip-flop 84. The pulse subtracter flip-flop 80 serves as part of a circuit for causing the cue signal counter 66 to fail to count the first cue signal detected when the tape is moved in the rewind mode at the start of a search operation. The reason for this may be best appreciated by reference to FIG. 4. In this figure, the tape 16 is indicated at the bottom of the figure and a number of cue signals recorded thereon are indicated by the shaded blocks 85, 86, 87 and 88. The block 85 represents the initial or number zero cue signal on the tape which preceeds and identifies the initial or number zero program. The block 86 similarly represents the number one cue signal on the tape, the block 87 represents the number two cue signal on the tape and block 88 represents the number three cue signal. The initial or number zero program extends between the number zero and number one cue signal, the number one program extends between the number one and number two cue signal, etc.

Figure 4:
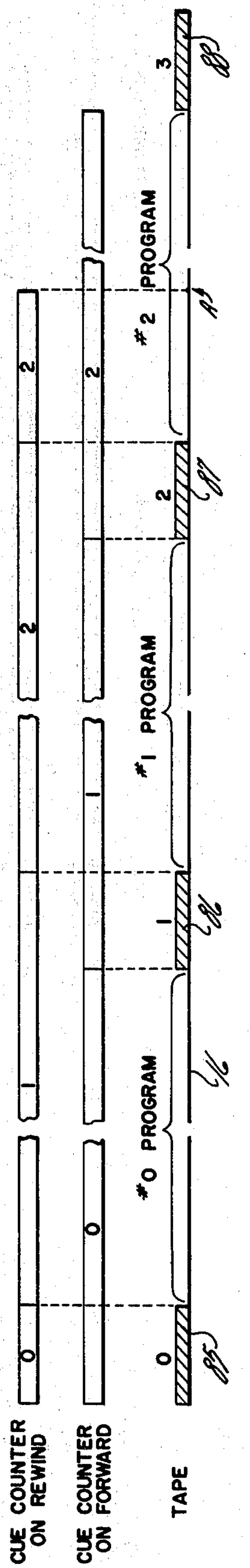
FIG. 4 is a diagram illustrating the manner in which the cue signal counter counts the cue signals on the tape of the recorder of FIG. 1 when the tape is moved in the forward direction and when the tape is moved in the reverse direction.

The line immediately above the tape 16, in FIG. 4 indicates the manner in which the cue signal counter counts as the tape 16 is moved in its forward direction. That is, when the tape moves in the forward direction, the cue signal counter, assuming that the tape movement is started when either the number zero cue signal or the number zero program is positioned adjacent the pick-up head 46, remains at a zero count until reaching the number one cue signal 86. Circuitry hereinafter described prevents the cue signal counter from counting any cue signal on which the pick-up head 46 may be positioned at the time the tape movement is started and, therefore, if the number zero cue signal is positioned at the pick-up head at the start of the tape movement this cue signal does not change the count of the cue counter. After reaching and counting the number one cue signal, the cue signal counter remains at the count of one until the number two cue signal reaches the pick-up head and the counter is then switched to a count of two. Thereafter, as each cue signal reaches the pick-up head the count of the counter is increased by one.

Assume now also that when the tape movement was started the dial counter contained a count of two. Therefore, as soon as the number two cue signal reaches the pick-up head, the cue signal counter is shifted into parity with the dial pulse counter and, by the circuitry hereinafter described, the fast forward movement of the tape is immediately stopped so that the pick-up head 46 will accordingly be located at or close to the beginning of the desired number two program.

In FIG. 4 the second line above the tape 16 represents the counting of the counter when the tape recorder is operated in the rewind mode during a search operation. Assume that when the recorder is placed in rewind the pick-up head is at approximately the point A on the tape 16. At this point, the pick-up head is between the number two cue signal and the number three cue signal and the cue signal counter indicates a count of two. Assume also that when the tape recorder is set into the rewind mode, the dial counter indicates a count of one representing a request that the number one program be searched for. As the tape moves in its rewind direction, the pick-up head first encounters the number two cue signal 87. If this cue signal were permitted to change the count in the cue signal counter, the count would be changed from two to one, the comparator 68 would then detect a parity condition between the two counters and the associated circuitry would cause the tape recorder to stop and when the tape movement was stopped the pick-up head would be located at the end rather than the beginning of the number one program. Therefore, to avoid this error, the first detected cue signal 87 is not counted and the cue signal counter remains at the count of two until the next cue signal is detected by the pick-up head. This next signal is the number one cue signal 86 and, therefore, when the comparator detects a parity condition and the tape movement is stopped, the pick-up head is located close to the beginning of the desired number one program.

The fast forward flip-flop 82 and the rewind flip-flop 83 comprise parts of circuits for causing the tape recorder to reverse the direction of tape movement for the purpose of recuing the tape after the comparator 68 detects a parity condition. That is, at the beginning of a search operation the tape is moved in either a fast forward or rewind (fast reverse) direction until a parity condition is reached. When such parity condition is reached, the tape recorder is conditioned to bring the tape movement to a stop, but due to inertia effects and the fast speed of the tape this stopping does not occur instantaneously, and by the time the tape is brought to a complete stop the pick-up head 46 is usually located some distance from the last detected cue signal. For this reason, the tape recorder is thereafter automatically conditioned to move the tape in the opposite direction to bring the cue signal back to the pick-up head, if necessary, so that when the recorder is thereafter placed in the play mode, the program following the last detected cue signal will be played from its very beginning.

The play flip-flop 84 is part of a circuit for controlling the conditioning of the associated tape recorder for operation in its play mode, and this circuit among other things causes the tape recorder to be placed in its play mode after the tape is recued to the parity causing cue signal, and causes the program following such cue signal to be replayed after its end is reached, provided the stop-play and the clear-search switches 26 and 27 are in the proper positions.

Other functions are performed by the illustrated components of FIGS. 3A, 3B and 3C and these components and their operations may best be understood by considering the overall operation of the illustrated system. Before considering such description, however, it should be noted that the components A, C, D, E, G, I, K, N, P, R, S, T, V, W, DD, EE, HH, JJ, KK, LL, NN, and QQ are AND gates, the components B, F, J, L, M, Q, V, X, Y, Z, AA, BB, CC, GG, MM, and PP are OR gates, and the components 106, 108, 112, 114, 115, 118, 120, 125, 132, 134, 136, 138, 140, 142, and 144 are inverters. The component 90 is a relay which operates and includes the fast forward contacts 57, the component 91 is a relay which operates and includes the rewind contacts 58 and the component 92 is a relay which operates and includes the play contacts 59. The components 93, 94, 95, 96, 97 and 98 are time delays having the characteristic that when a one level input signal is applied to the input thereof the output therefrom does not rise to the one level until the lapse of a predetermined delay period. Each of these time delays may, for example, consist of a resistor connected between the input line and the output line and a capacitor connected between the output line and ground and initially discharged so that when a signal is applied to the input line the capacitor must charge through the resistor before the signal on the output line rises to the one level. The components 99, 100, 101, 102 and 103 are differentiating circuits for producing a pulse at their output terminals when a one level signal is initially applied to their input terminals. These components may each be comprised, for example, of a capacitor connected between the input terminals and the output terminal.

It should also be noted that in FIGS. 3A, 3B and 3C, the on-off switch 28 of FIG. 1 is not shown. As mentioned, in the *on* position this switch turns on power to various components of the system and in the *off* position removes such power. In the *off* position, however, it is preferred that power nevertheless be supplied to the dial counter 62, the cue signal counter 66, the fast forward flip-flop 82 and rewind flip-flop 83 so that these units retain their memories even when the power switch is in its *off* position. In the absence of this feature, or when total power is removed from the unit, the unit 10 should first be operated, before turning off the power, so that the zero number program is searched for and the tape recorder stopped when such program is reached. This is accomplished by setting the switch 27 in the *clear* position, dialing zero on the dial switch 24 and then placing the switch 26 in the *stop* position and the switch 27 in the *search* position. After the search operation is completed, the dial counter will contain a zero count, the cue counter will contain a zero count and the flip-flops will be in their reset conditions so that total power may be removed from the unit without changing the state of any of these memory components.

Considering now the detailed operation of the system shown in FIGS. 3A, 3B, and 3C, assume that the on-off switch is in its *on* position so that power is supplied to the various components, and assume further that the tape recorder is stopped, that the cue signal counter shows a count of twenty-two and that it is desired to have the tape recorder play the number twelve program. Assume also that it is desired to have the tape recorder stop after the number twelve program has been played. To effect this stopping at the end of the program, the operator places the stop-play switch 26 in the *stop* position. To make the program selection, the operator thereafter first places the search-clear switch in the *clear* position. This resets the dial pulse counter 62 to a zero count by supplying a pulse to the resetting circuit 77 through the action of the AND gate A, the differentiator 101 and the OR gate B. This also resets the fast forward flip-flop 82 and the rewind flip-flop 83, by applying the same pulse to the line 85, through the OR gates BB and CC which have their outputs respectively connected to the reset terminals of said flip-flops. In referring to these flip-flops, as well as the pulse subtracter flip-flop 80 and the play flip-flop 84, it should be noted that the letter R is used to indicate the reset terminals and the letter S to indicate the set terminals. Each flip-flop has two output terminals on which appear zero or one level signals. In the case of each of the flip-flops shown, the output terminals are indicated by the signals which appear thereat when the flip-flop is in its reset condition. In the set condition the output signals are reversed from those shown. All of the flip-flops are bistable so that when a one level pulse is applied to the set terminal of any one thereof the signals thereafter appearing at its output terminals remain in a set condition until a one level signal is applied to the reset terminal.

The placing of the search-clear switch 27 in its *clear* position prevents any output from the comparator 68 from reaching the remainder of the logic circuit by closing AND gates C and D located in the comparator output lines 78 and 79. That is, the output from the AND gate A is applied to each of the AND gates C and D through inverters 106 and 108 so that when an output is produced from the AND gate A the AND gates C and D are closed. The placing of the switch 27 in the *clear* position also opens the AND gate E located between the dial 24 and the dial pulse counter 62 so as to allow pulses from the dial switch to reach the dial counter.

After the switch 27 is placed in the *clear* position, the dial 24 is operated by dialing the desired number, in this instance assumed to be the number twelve. The pulses from the dial switch pass through the gate E and set the dial counter 62 so as to show a count of twelve at the end of the dialing process. After the dialing is completed, the search-clear switch 27 is placed in the *search* position. The loss of the "clear" signal from the AND gate E closes this gate and prevents further manipulation of the dial from changing the dial counter during the search operation. The loss of the "clear" signal also closes the AND gate A and removes the one level signal from its output line, thereby unblocking the AND gates C and D. Since the dial pulse counter 62 now shows a count lower than the cue signal counter 66, the comparator 68 produces a one level signal on the line of 79 and a zero level signal on the line 78 and, therefore, a one level signal is produced at the output of the gate C which is referred to as a DCL signal. This DCL signal is applied to the circuit 74 for causing the comparator 68 to count in the reverse direction. The DCL signal also produces a pulse from the differentiator 99 which sets the pulse subtractor flip-flop 80. A one level signal is thereupon applied to the line 110 which after running of the time delay 93 produces a one level input to the OR gate M. Through the OR gate H and AND gate G a zero level input is supplied to the OR gate M. Through the OR gate F and the differentiator 100, the DCL signal applies a pulse to the OR gate M which persists for a determined length of time. Accordingly, a zero level signal is provided from the inverter 138 and applied to the AND gate N to close the same throughout the duration of the pulse from the differentiator 100 and following the running of the time delay 93. The pulse signal from the OR gate F and the differentiator 100 is intended to hold the AND gate N closed for a predetermined amount of time whenever the tape 16 is set in motion in order to prevent the cue signal counter 66 from counting any signal produced by a cue signal located adjacent the pick-up head 46 at the time the tape motion is started. The length of the pulse produced by the differentiator 100 is accordingly of such a time duration as to exceed the time duration of any cue signal provided from the cue signal amplifier and trigger 64. After the running of the time delay 93, which occurs at approximately the same instant as the termination of the pulse from the differentiator 100, the one level signal provided therefrom acting through the OR gate M and inverter 138 holds the AND gate N closed until the pulse subtractor is reset.

As soon as the DCL signal appears, it energizes the rewind relay 91 through the OR gate J and AND gate K and closes the rewind relay switch 58 to place the tape recorder in the rewind mode of operation. At the same time, the DCL signal is also applied to the AND gate I, through the time delay 94 and inverter 112, and thereby closes the AND gate I to positively prevent operation of the fast forward relay 90. Likewise, the DCL signal produces a signal, referred to as an "uncompared" signal, from the OR gate H which is applied to the AND gate DD controlling the play relay 92, the "uncompared" signal being applied through the inverter 114 so that the AND gate DD is closed thereby to prevent energization of the play relay. Therefore, when the rewind relay 91 is energized, both the fast forward relay 90 and the play relay 92 are positively clamped or locked in an off condition.

The output from the AND gate K, referred to as an RW signal, which energizes the rewind relay 91 is also applied to the AND gate P together with the DCL signal and produces an output from the gate P, passing through the OR gate Q, which is applied directly to AND gates R and S to open said gates and which is applied to the AND gate T through an inverter 115 to close said gate. The AND gates R, S and T also have as inputs thereto the cue signal produced by the cue signal amplifier and trigger 64 and, therefore, when the tape starts moving as a result of the tape recorder having been placed in its rewind mode, the first cue signal detected passes through and AND gate S and sets the rewind flip-flop 83. The setting of this flip-flop produces an output on the line 116 which passes through the OR gate X and time delay 98 and is applied to the AND gate DD through an inverter 118 so that the AND gate DD is held closed for as long as the rewind flip-flop 83 is in its set condition, thereby preventing operation of the play relay 92.

After the tape is started in its rewind motion, the first cue signal detected by the pick-up head 46 is applied to the pulse substracter 80 through the OR gate L and resets this flip-flop to its reset condition. As the signal on the output line 110 accordingly shifts from the one level to the zero level, the time delay 93 delays this change for a sufficient length of time to hold the AND gate N closed during the appearance of the cue signal and therefore this cue sginal does not pass to the cue signal counter 66 and is not counted for the reason explained above in connection with FIG. 4. After the running of the time delay 93, all of the inputs to the OR gate M are at the zero level and, therefore, a one level signal is applied from the inverter 138 to the AND gate N which opens this gate to permit further cue signals to pass to the cue signal counter 66. The next cue signals, therefore, are counted by the cue signal counter, which being set to count in the reverse direction by the circuit 74, continues counting down until sufficient cue signals have been received thereby to cause it to show a count of twelve. When this occurs its count equals the count of the dial pulse counter 62 and the comparator thereupon operates to remove the one level signal from the output line 78 so that both the lines 78 and the line 79 contain zero level signals. The loss of the DCL signal from AND gate C de-energizes the rewind relay 91 and the tape recorder comes to a stop at which time the last cue signal detected by the pick-up head 46 is most likely located some distance from the head. At this point it should be noted that as soon as the parity causing cue signal is detected the output from the AND gate P is lost, but despite this lost signal an output from the OR gate Q is maintained throughout the duration of such cue signal through the latching action of AND gate R on OR gate Q. Therefore, the AND gate T is maintained in a closed condition throughout the duration of the parity causing cue signal and this signal accordingly is kept from passing through the AND gate T and from resetting the rewind flip-flop 83.

The loss of the DCL signal, as a result of the parity causing cue signal, also unclamps the AND gate I controlling the fast forward relay 90, and the rewind flip-flop 83 is at this time still in a set condition at which a one level signal appears on its output line 116. The AND gate U is also unblocked by the disappearance of the RW signal and, therefore, the one level signal on the line 116 passes throhugh the AND gate U, OR gate V and AND gate I and energizes the fast forward relay 90 to cause the contacts 57 to be closed and the tape recorder to accordingly be placed in the fast forward mode of operation in which the tape is moved in such a direction as to return the last detected cue signal toward the pick-up head 46. The fast forward relay 90 is not, however, operated until the time delay 94 times out and this delay assures that the tape has time enough to come to a complete stop before it is moved in the reverse direction.

After the fast forward relay is energized, the tape is moved in the forward direction until the parity causing cue signal on the tape is returned to the pick-up head 46, at which time it produces another output from the cue signal amplifier and trigger 64. This latter cue signal is not counted by the cue signal counter 66 insofar as the AND gate N is now closed by the loss of the "uncompared" signal from the OR gate H which acts on the AND gate N through the inevrter 142, the AND gate G, the OR gate M and the inverter 138. This cue signal does, however, pass through the AND gate T and OR gate CC and resets the rewind flip-flop 83, the AND gate T being at this time open as a result of the loss of signal from the OR gate Q. The resetting of the rewind flip-flop 83 removes the one level signal from the line 116 and accordingly de-energizes the fast forward relay 90 to bring the tape to a stop.

At this point in the operation of the unit, referred to as the end of the recuing process, the comparator is in a compared state, the tape is located with the beginning of the desired program located at the pick-up head 46, and other heads of the tape recorder, and all of the flip-flops are in their reset conditions. The stop-play switch 26 is in the *play* position as a result of having been placed in this position by the operator when dialing the desired program. Also, as a result of both of the flip-flops 82 and 83 being reset, a zero level output signal is produced from the OR gate X. Accordingly, the four inputs to the AND gate DD are such that this gate is open and an output signal is produced which energizes the play relay 92. It should be noted, however, that the AND gate DD is opened immediately upon the resetting of the rewind flip-flop 83 and that the zero level signal supplied to the AND gate DD from the OR gate X when the flip-flop 83 is reset first passes through the time delay 98. The delay produced by the time delay 98 is of such duration as to assure that the tape is brought to a complete stop before being put into the play mode. This guards against tape breakage because when the tape recorder is placed in the play mode the pressure wheel 42 is moved into engagement with the tape and if the tape is moving at a fast rate of speed it can act as a brake exerting an undue tension force on the tape.

It should also be noted that when the fast forward flip-flop is reset at the end of the recuing step, the fast forward signal which is applied to the OR gate Y, although lost, is maintained on the OR gate AA throughout the running of the time delay 96. This time delay is sufficient to allow the tape recorder, after immediately being shifted to its play mode as a result of its stop-play switch being in its *play* position, to move the cue signal on the tape away from the pick-up head 46 so that the AND gate W remains closed while the cue signal is detected by the pick-up head and so that the cue signal does not set the play flip-flop 84.

After the play relay 92 is energized, and the tape recorder thereby set into the play mode of operation, the recorder stays in this mode until the end of the program being played is reached, assuming that the stop-play switch 26 is maintained in the *play* position. When the end of the program is reached, the pick-up head 46 senses the cue signal marking the start of the next following program and a cue signal pulse is produced from the cue signal amplifier and trigger 64 which passes through the AND gate W and sets the play flip-flop 84, thereby de-energizing the play relay 92 through the AND gate DD. It should be noted that the cue signal at this time is applied both to the AND gate W and the OR gate AA but the output from the OR gate AA produced by this cue signal is delayed by the time delay 97 so that the AND gate W is held open through the inverter 120 for sufficient amount of time to allow the cue signal to pass through the AND gate W and set the play flip-flop 84.

During the play mode the play signal which is applied to the play relay 92 is also applied to the AND gate G through the inverter 140 and through OR gate M and inverter 138, opens AND gate N to permit the cue signal counter 66 to count the next cue signal. Therefore, when the program being played reaches its end and the next cue signal is detected by the pick-up head 46, the cue signal counter 66 counts this pulse and as a result the comparator 68 now detects the fact that the cue signal counter contains a higher count than the dial pulse counter and produces a one level signal on the comparator output line 79. Therefore, the same process as described above is repeated as a result of this signal, the tape recorder first being rewound until the comparator senses a parity condition, the tape then being recued by moving in the fast forward direction to bring the last detected cue signal back to the pick-up head, and the tape recorder then being placed in the play mode to replay the program. This replaying of the program continues until either the stop-play switch 26 is placed in the *stop* position or the search-clear switch 27 is placed in the *clear* position. If the stop-play switch 26 is placed in the *stop* position the tape recorder stops playing immediately as a result of lost signal to the AND gate DD. If the search-clear switch is placed in the *clear* position the tape recorder will continue to play the program being played until its end is reached. Then when the program end is reached, further action is prevented as a result of the AND gates C and D being closed so as to prevent the signal on the line 79 from actuating the remainder of the logic circuit.

If the desired program selected by operation of the dial switch 24 has a number higher than the number in the cue signal counter at the time the program number is dialed into the central unit, substantially the same process as described above is repeated except that the pulse subtracter flip-flop 80 is not brought into play, the cue signal counter is conditioned to count in the forward direction rather than the reverse direction, and the tape recorder is first moved in the fast forward direction to locate the cue signal corresponding to the desired program and then moved in the rewind direction to recue the tape. For example, assume that the cue signal counter contains a count of eight and that the desired program has assigned to it the number twenty-six. The search-clear switch 27 is first placed in the *clear* position and the dial switch 24 operated to dial into the dial pulse counter the number twenty-six. The search-clear switch 27 is then placed in the *search* position and the AND gates C and D are thereby opened. Since the dial pulse counter 62 now contains a number higher than the cue signal counter 66 a one level signal is produced on the output line 78 and a zero level signal is produced on the output line 79. Accordingly, a one level signal, referred to as a DCH signal, is produced at the output of the gate D and this signal is applied to the circuit 72 for causing the counter 66 to count in the forward direction. At the same time the DCH signal is applied through the OR gate V and AND gate I to energize the fast forward relay 90. An output is thereby produced from the AND gate EE which passes through the OR gate GG and opens the gates HH and JJ and closes the gate KK through the inverter 125. When the tape recorder thereafter moves the tape in the fast forward direction the first cue signal picked up by the pick-up head 46 passes through the gate JJ and sets the fast forward flip-flop 82.

When the comparator 68 thereafter detects a parity condition the one level signal is lost from the line 78 and the fast forward relay 90 is de-energized. The fast forward relay flip-flop 82, now being in a set condition, provides an output on the associated line 126 which passes through the AND gate LL and OR gate J and AND gate K to energize the rewind relay 91. The tape recorder is, therefore, caused to move the tape in the rewind director until the last detected cue signal is again detected. This cue signal is not counted by the cue signal counter 66 due to the AND gate N being closed by the loss of the "uncompared" signal previously supplied to the AND gate G by the OR gate H. This cue signal, however, resets the fast forward flip-flop 82 through the now open AND gate KK and OR gate BB and the resetting of this flip-flop opens the play controlling AND gate DD through the time delay 98 and inverter 118 to energize the play relay 92 and place the tape recorder in the play mode. From this point on, the sequence of operation is the same as that previously described.

It should be noted that at the end of the recuing process, during which the tape is moved to bring the last parity causing cue back to the pick-up head 46, the pick-up head 46 will most likely be located on the cue signal of the tape. As mentioned previously, if the stop-play switch 26 is in the *play* position the tape recorder is switched to the play mode immediately following the recuing process, and the time delay 96 assures that the play flip-flop 84 is not set by the cue signal on which the pick-up head may be located at the beginning of the play mode. If the stop-play switch 26 is in the stop position at the end of the recuing process the tape recorder will stop and will not go into the play mode until the switch is moved to the *play* position. In this event the differentiator 103 provides a pulse, produced by the operation of the switch 26, which is applied to the OR gate AA and which, similarly to the time delay 96, closes the AND gate W for a sufficient interval of time to prevent the cue signal from setting the play relay 84 at the beginning of the play operation.

The cue signal control circuit 70 is shown at the right in FIG. 3C and, except for the reset push button 33, is essentially separate from the remainder of the control unit. The reset push button 33 when pressed produces a "reset" signal which is transmitted to the OR gate B to reset the dial counter 77 and to the OR gate L to reset the pulse subtracter 80. The output from the OR gate B is also supplied to the OR gates BB and CC to reset the fast forward flip-flop 82 and the rewind flip-flop 83. The dial counter 77 and the fast forward flip-flop 82 and rewind flip-flop 83 are also reset whenever the search-clear switch is placed in the *clear* position except that such resetting is prevented by the OR gate MM and AND gate A whenever the tape recorder is operating in the fast forward or rewind mode. The cue push button 34 of the cue signal control, when depressed, energizes an adjustable duration tone timer 130 which opens an associated AND gate NN to allow a tone from a suitable source to pass to the cue signal recording head 48. At the same time, the output of the adjustable duration tone timer 130 passes through OR gate PP and opens AND gate QQ to apply an erasing bias to the erase head 50. When the erase button is depressed the AND gate QQ is also opened to apply the erasing bias to the erase head 50.

Although the preferred embodiment of the invention has been described above it should be understood that various changes may be made from the construction disclosed, and that the drawings and description are not to be construed as defining or limiting the scope of the invention, the claims which follow being relied upon for that purpose.

What is claimed is:

1. A dial operated control mechanism for use with a tape recorder or the like using a record medium having a plurality of cue signals recorded thereon each marking the start of one of a number of individual programs recorded serially on said record medium and including a pick-up device for detecting said cue signals as said record medium is moved therepast, said control mechanism comprising:

a dial switch;

a dial counter for counting pulses from said dial switch;

a cue signal counter for counting cue signals detected by said pick-up device;

a comparator for comparing the count of said dial counter with the count of said cue signal counter to produce a first output signal when the count of said dial counter exceeds the count of said cue signal counter, to produce a second output signal when the count of said cue signal counter exceeds the count of said dial counter, and to produce a third signal when said counts are equal;

a logic circuit coupled to the recorder and responsive to the comparator output signals, said logic circuit including:

first means responsive to said first signal conditioning said recorder to move said record medium in a fast forward manner;

second means responsive to said second signal conditioning said recorder to move said record medium in a fast reverse manner; and third means responsive to said third signal conditioning said recorder to play the program following the cue signal which shifted said cue signal counter into parity with said dial counter;

fourth means conditioning said cue signal counter to count in a forward direction in response to said first signal;

fifth means conditioning said cue signal counter to count in a reverse direction in response to said second signal; and sixth means for preventing said cue signal counter from counting the first cue signal detected by said pick-up device after said recorder is switched to said fast reverse mode of operation by said logic circuit.

2. A dial operated control mechanism as defined in claim 1 wherein said sixth means includes a bistable flip-flop having set and reset conditions, means for setting said flip-flop in response to the initiation of said second signal from said comparator, means for thereafter resetting said flip-flop in response to the detection of a cue signal by said pick-up device, an AND gate connected between said pick-up device and said cue signal counter, and means for closing said AND gate to prevent cue signals detected by said pick-up device from reaching said cue signal counter whenever said flip-flop is in its set condition and for a short period of time following the resetting of said flip-flop, said period being longer than the duration of any of said cue signals when said record medium is moved in said fast reverse manner.

3. A dial operated control mechanism as defined in claim 1 wherein said medium is magnetic tape and wherein each cue signal consists of a tone recorded in one channel of said tape and extending along a substantial length of said tape so as to produce a tone signal in said pick-up device lasting for a substantial amount of time as said tape is moved therepast, said control mechanism being further characterized by means for closing said AND gate to prevent cue signals detected by said pick-up device from reaching said cue signal counter for a short period of time immediately following the conditioning of said recorder by said logic circuit for operation in any of said fast forward, fast reverse or play modes, said short period of time being at least as long as the duration of any of said cue signal so as to prevent the counting of any cue signal located adjacent said pick-up device at the time said tape is set in motion.

4. A dial operated control mechanism as defined in claim 1 wherein said logic circuit includes a manually operable search-clear switch, means operable when said search-clear switch is in its search position for preventing said dial switch from changing the count in said dial counter, and means operable when said search-clear switch is in its clear position and said recorder is conditioned by said logic circuit for operation in neither its fast forward nor fast reverse mode of operation for enabling said dial switch to change the count of said dial counter.

5. A dial operated control mechanism as defined in claim 1 wherein said logic circuit includes means for maintaining said recorder in its play mode of operation once put in said mode until said pick-up device detects the next following cue signal.

6. A dial operated control mechanism as defined in claim 5 wherein said logic circuit includes a manually operable search-clear switch, and means operable when said search-clear switch is in its search position for causing the associated recorder in response to the detection of said next following cue signal to move said record medium in the reverse direction to the beginning of the program just played and to then replay said program.

7. A dial operated control mechanism as defined in claim 6 wherein said comparator has two output lines feeding said logic circuit on which zero and one level signals appear depending on the nature of the comparison made thereby, a one level signal appearing on one of said lines and a zero level signal on the other of said lines when the count of said dial counter exceeds the count of said cue signal counter, a zero level signal appearing on said one line and a one level signal on said other line when the count of said cue signal counter exceeds the count of said dial counter, and two zero level signals appearing on said line when the count of said dial counter is equal to the count of said cue counter, two AND gates each in a respective one of said comparator output lines, and means for closing said latter two AND gates when said search-clear switch is in its clear position so as to maintain two zero level siganls on the associated inputs to sair logic circuit despite a subsequent change in the comparison made by said comparator.

8. A dial operated control mechanism as defined in claim 7 further including an AND gate between said dial switch and said dial counter, and means for closing said latter AND gate when said search-clear switch is in its search position.

9. A dial operated control mechanism as defined in claim 8 further including means for closing said AND gate between said dial switch and said dial counter and both of said AND gates in said comparator output lines whenever said logic circuit conditions said recorder for operation in either its fast forward or fast reverse mode of operation.

10. A dial operated control mechanism as defined in claim 1 wherein said comparator has two output lines feeding said logic circuit on which zero and one level signals appear depending on the nature of the comparison made thereby, a one level signal appearing one of said lines and a zero level signal appearing on the other of said lines when the count of said dial counter exceeds the count of said cue signal counter, a zero level signal appearing on said one line and a one level signal on said other line when the count of said cue signal counter exceeds the count of said dial counter, and two zero level signals appearing on said lines when the count of said dial counter is equal to the count of said cue signal counter, and wherein said logic circuit includes means responsive to a one level signal appearing on said one line for conditioning said recorder for operation in a fast forward mode, means responsive to a one level signal appearing on said other line for conditioning said recorder to operate in a fast reverse mode and means operable when the zero level signals thereafter appear on said two output lines for conditioning said recorder to move said record medium in such a manner as to return the cue signal which caused said comparator to produce said two zero level signals to said pick-up device and to thereafter play the program following said latter cue signal.

11. A dial operated control mechanism as defined in claim 10 further characterized by said means for conditioning said recorder to return the cue signal which caused said comparator to produce said two zero level signals to said pick-up device comprising a fast forward flip flop and a fast reverse flip-flop means for setting said fast forward flip-flop when said recorder is initially conditioned for operation in its fast forward mode, means connected with said fast forward flip-flop and operable when said latter flip-flop is in its set condition for conditioning said recorder for operation in its fast reverse mode after its latter opertaion in its fast forward mode is terminated and means operable in response to the detection of a cue signal by said pick-up device for thereafter resetting said fast forward flip-flop to terminate operation in said fast reverse mode, and means operable in response to the setting of said fast forward flip-flop for conditioning said recorder for operation in the play mode.

12. A dial operated control mechanism as defined in claim 11 wherein said means for conditioning said recorder to return the cue signal which causes the comparator to produce said two zero level signals to said pick-up device further comprising means for setting said fast reverse flip-flop when said recorder is initially conditioned for operation in its fast reverse mode, means connected with said fast reverse flip-flop and operable when said latter flip-flop is in its set condition for conditioning said recorder for operation in its fast forward mode after its latter operation in its fast reverse mode is terminated, and means operable in response to the detection of a cue signal by said pick-up device for thereafter resetting said fast reverse flip-flop to terminate operation in said fast forward mode, and means operable in response to the resetting of said fast reverse flip-flop for conditioning said recorder for operation in the play mode.

13. A dial operated control mechanism as defined in claim 12 wherein said means for conditioning said recorder for operation in a play mode includes a play flip-flop having a reset state in which said recorder is enabled to operate in its play mode and set condition in which said recorder is prevented from operation in its play mode, and means for setting of said play flip-flop so as to terminated operation of said recorder in its play mode in response to the detection of a cue signal by said pick-up device after said recorder has been placed in its play mode.

14. A dial operated control mechanism as defined in claim 13 wherein said logic circuit includes means operable in response to the termination of operation of said recorder in its play mode for conditioning said recorder to immediately thereafter search for and then play the program corresponding to the count of said dial counter at the time said play operation is terminated.

15. A dial operated control mechanism as defined in claim 14 further including means for resetting said play flip-flop in response to said recorder being conditioned for operation in either its fast forward or fast reverse mode of operation.

References Cited

UNITED STATES PATENTS 3,376,564 4/1968 Holland ---------- 179—100.2

FOREIGN PATENTS 810,111 3/1959 Great Britain.

OTHER REFERENCES

IBM Tech. Disc. Bulletin, vol. 10, No. 1, June 1967, pp. 17–19.

J. RUSSELL GOUDEAU, Primary Examiner

U.S. Cl. X.R.

340—174.1